J. H. JACOBS.
ASSAY BALANCE.
APPLICATION FILED JULY 2, 1917.

1,258,009.

Patented Mar. 5, 1918.
2 SHEETS—SHEET 1.

Inventor
Joseph H. Jacobs
By
Attorney

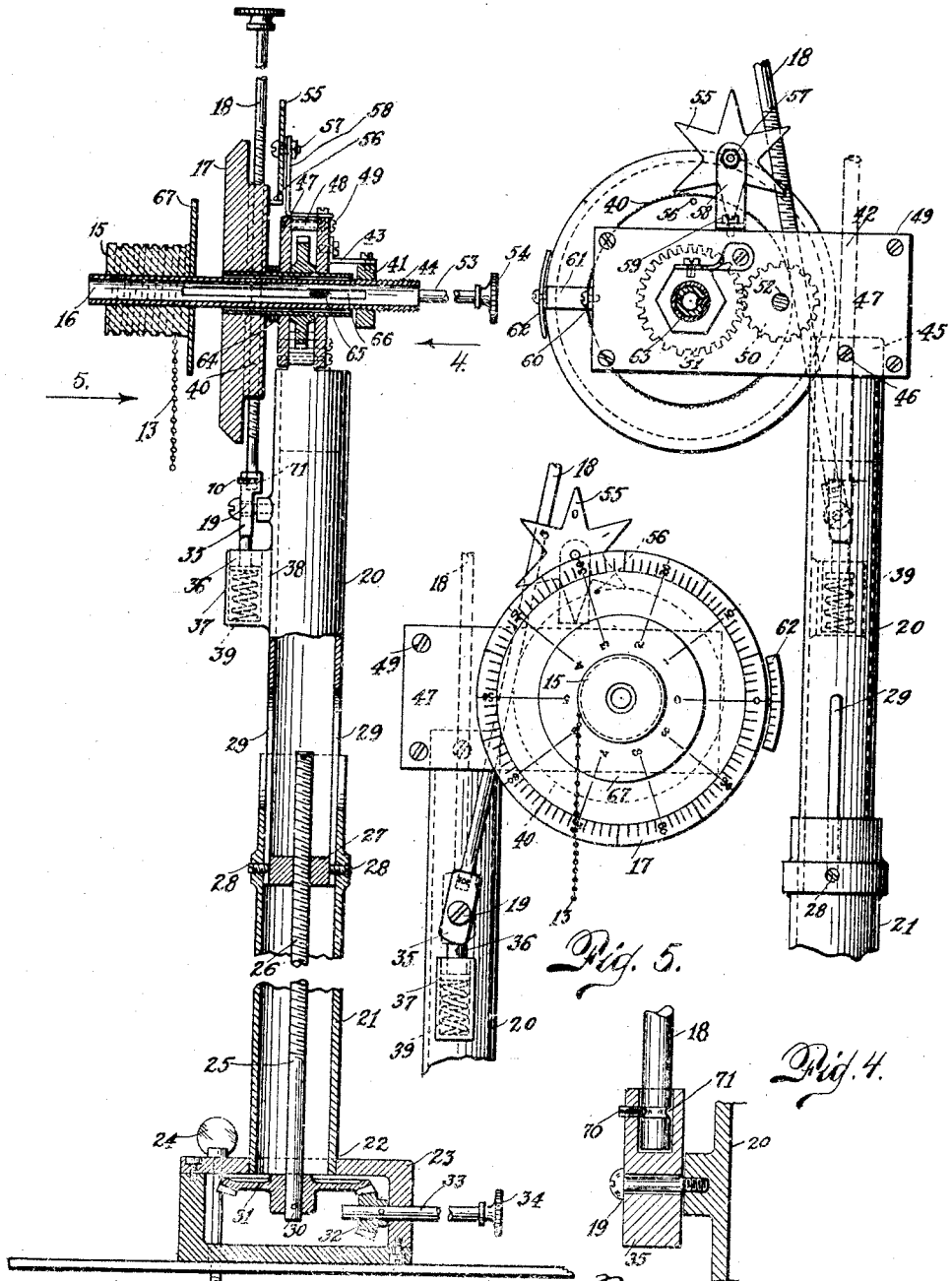

UNITED STATES PATENT OFFICE.

JOSEPH H. JACOBS, OF DENVER, COLORADO.

ASSAY-BALANCE.

1,258,009.	Specification of Letters Patent.	Patented Mar. 5, 1918.

Application filed July 2, 1917. Serial No. 178,104.

*To all whom it may concern:*

Be it known that I, JOSEPH H. JACOBS, a citizen of the United States, residing at the city and county of Denver and State of Colorado, have invented certain new and useful Improvements in Assay-Balances; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in balances adapted for use by assayers and others where great precision is required. Furthermore, it relates to that type of balances in which a chain is employed, one extremity of the chain being connected with the beam of the balance while the other is connected with an adjustable member, whereby more or less of the chain may be adjusted to bear upon the beam as may be required by the conditions of any particular case. The present invention relates more particularly to certain improvements in the mechanism whereby the adjustment of the chain is accomplished.

Having briefly outlined the invention, as well as the function it is intended to subserve, I will proceed to describe the same in detail reference being made to the accompanying drawing in which is illustrated an embodiment thereof. In this drawing:

Fig. 3 is a view largely in section illustrating the mechanism of the invention, the parts being shown on a larger scale than in views 1 and 2.

Fig. 4 is a fragmentary view of the structure looking in the direction of arrow 4, Fig. 3.

Fig. 5 is a similar view looking in the direction of arrow 5, Fig. 3.

Fig. 6 is a fragmentary vertical section, illustrating the mounting of the worm spindle for adjusting the dial.

The same reference characters indicate the same parts in all the views.

Figure 1:
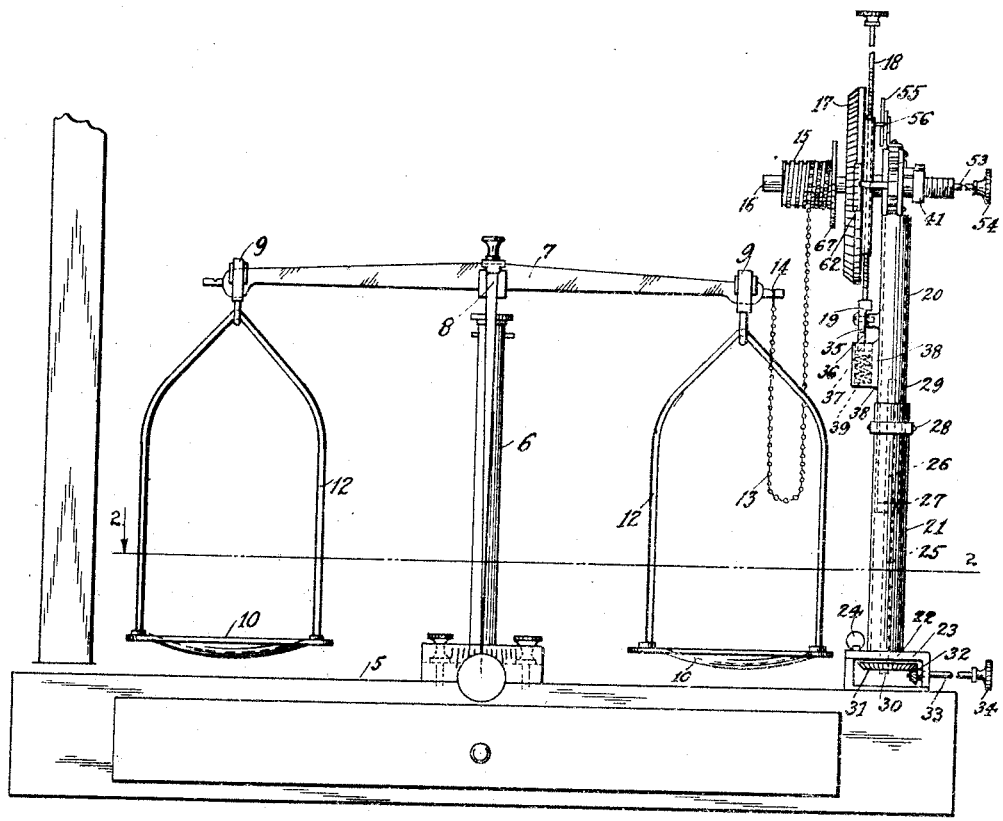
Figure 1 is an elevation of a balance equipped with my improvement.
Figure 2:
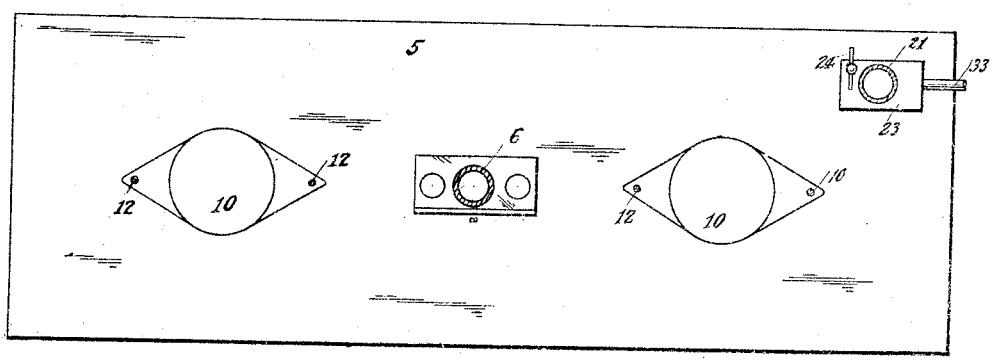
Fig. 2 is a horizontal section taken on the line 2—2, Fig. 1, looking downwardly.

Let the numeral 5 designate the base of the balance, 6 a centrally located upright post, upon which the beam 7 is mounted by means of the usual knife-blade joint 8, the opposite extremities of the beam being equipped with knife-blade bearings 9 from which the pans 10 are suspended through the medium of the depending wire supports 12. These features are of ordinary construction.

In my improvement one extremity of a weighing chain 13 is connected, as shown at 14, with one end of the beam, while the opposite extremity of the chain is connected with a drum 15 mounted on a spindle 16, upon which is also mounted a graduated dial 17. This dial is frictionally mounted on the spindle and therefore, capable of independent movement, which may be accomplished through the medium of a worm spindle 18, which is pivotally connected as shown at 19 with a vertically movable, tubular member 20, which telescopes in a hollow post 21, whose lower extremity is secured, as shown at 22, to a gear case 23, mounted on the base of the instrument and secured thereon by means of a screw 24, which passes through the gear case into the base. Centrally arranged within the hollow post is a stem 25 whose upper portion is threaded, as shown at 26, and engages a nut 27 which is secured to the lower extremity of the tube 20, this tube being prevented from rotary movement within the post 21 by means of screws 28 which pass through the wall of the hollow post and enter vertical slots 29 formed in the tubular member 20. To the lower extremity 30 of the stem 25, which extremity protrudes into the gear case, is attached a bevel gear 31 which meshes with a pinion 32 fast on an adjusting spindle 33 which extends beyond the casing of the instrument, and is provided with a milled-head 34 to facilitate adjustment. As the spindle 33 is rotated, the stem 25 is actuated to raise and lower the tube 20 within the hollow post 21, as circumstances may require. This adjustment results in transferring the weight of more or less of the weighing chain 13 to the beam as may be required.

The extremity 35 of the worm spindle, extends below the shaft and is engaged by a spring actuated piston 36 mounted in a cylindrical case 37 which is secured to the tube 20, as shown at 38. A spiral spring 39 is arranged within the cylinder 37 below the piston and exerts the necessary tension on the worm spindle for maintaining the latter in the desired position of adjustment. The worm of this spindle when the latter is in use, is thrown into engagement with a worm wheel 40 forming a part of the graduated dial 17, but of less diameter than the body of the latter. After the worm spindle is in engagement with the worm wheel member of the dial, the latter may be rotatably adjusted on the spindle 16 without turning the last-named spindle or interfering in any way with the other mechanism mounted thereon. When the worm spindle is not in use it is thrown toward the right (see dotted lines Fig. 4) in which position it is supported by virtue of the tension exerted on its lower extremity by the spring actuated piston member 36, as heretofore described.

The drum 15 with which one extremity of the weighing chain is connected, as heretofore described, is provided with a spiral groove, which the convolutions of the chain engage when the chain is wound upon the drum, thus preventing these convolutions from slipping or sliding upon the drum, which slipping or sliding action would interfere with the accuracy of adjustment of the chain for weighing purposes, as may be readily understood. The spiral groove of the drum has its convolutions accurately spaced, thus insuring absolute precision in the adjustment of the chain for weighing purposes. In order to compensate for the travel of the chain as it is wound upon or unwound from the drum 15, and in order that the two vertical runs of the chain may be uniformly spaced at all times, a nut 41, which is connected with the frame 42 by means of an angle arm 43, is engaged by an exteriorly threaded part 44 of the spindle 16, the threaded relation of this portion of the spindle and the nut being so arranged as to accurately perform the aforesaid function, whereby the spindle is caused to travel longitudinally in one direction the same distance that the chain would travel in the opposite direction to do the winding or unwinding of the chain on the spirally grooved drum 15.

The frame 42 is secured to the upper flattened extremity 45 of the tube 20 by means of a suitable fastening device, as a screw 46. The frame 20, as illustrated in the drawing, is composed of two parallel plates 47 which are separated by spacing sleeves 48 through which connecting screws 49 pass. Between these blades of the frame are located two gears 50 and 51, the gear 50 being journaled in the frame, as shown at 52 and meshing with the gear 51, which is fast on the spindle 16.

In order to rotate the shaft together with the graduated dial 17 and the drum 15, the gear 50 is rotated through the medium of a spindle 53, which is a continuation of the journal 52 of the last-named gear, the spindle 53 extending beyond the casing of the instrument and having a milled-head 54 to facilitate adjustment. As the gear 50 is rotated, a corresponding movement is imparted to the gear 51, the spindle 18 and the drum 15, whereby the weighing chain is wound thereon or unwound therefrom, as circumstances may require during the weighing operation. Every time the graduated dial 17 is given a complete rotation, a registering star wheel 55 is moved one space by virtue of the engagement of a pin 56, carried by the dial, with one of the teeth or projections of the star wheel, the latter being graduated to register the revolutions of the graduated dial. This star wheel is pivotally mounted, as shown at 57, on the upper extremity of an angle bracket 58 which is secured to the top of the frame 20, as shown at 59, the mounting being of such character that a tooth of the star wheel lies in the path of the pin 56 of the graduated dial every time this pin reaches a pre-determined position.

Secured to one end of the frame 20, as shown at 60, is a bracket 61, upon the outer extremity of which is mounted a vernier 62, which coöperates with the outer graduated zone of the dial 17, the function of the vernier in connection with the dial being of the usual or ordinary character. In order to protect the threaded portion of the spindle 16 from direct contact with the dial 17 the gear 51 and the other parts through which the spindle passes, the spindle is equipped with a sleeve 63 which is splined on its threaded portion to rotate therewith, but which is locked against longitudinal travel thereon, since a collar 64 is secured to the sleeve between the dial 17 and the adjacent plate 47 of the frame. The splined relation is brought about by a lip 65 which is integral with the sleeve and bent inwardly into engagement with a slot 66 formed in the threaded portion of the spindle.

From the foregoing description the use and operation of my improved construction will be readily understood. The vertical movement of the mechanism mounted on the tube 20 is accomplished by actuating the adjusting spindle 33, as heretofore described. It is evident that all of the mechanism mounted on the spindle 16, as well as that carried by the frame 20 will be raised or lowered as may be required by this operation. It is also evident that the length of the vertical run of the weighing chain 13, which is connected with the beam, will be varied by this adjustment without the rotation of the dial 17. The independent adjustment of the dial 17 on its spindle may be accomplished through the medium of the worm spindle 18, which engages the worm wheel member 40, as heretofore explained. The rotary adjustment of the dial is regularly effected through the medium of the spindle 53, which when rotated actuates the gears 50 and 51, whereby the spindle 16 is rotated with the result that the dial 17 and the drum 15 are actuated. Attention is called to the fact that the size of the drum 15 may be varied, as circumstances may require, and according as it is necessary to increase or diminish the adjustment of the weighing chain for a given rotary travel of the spindle. For this reason the drum 15 is frictionally held upon the spindle and may be removed and replaced at pleasure. A number of these drums may be employed in connection with the instrument, the drums being, of course, of different sizes. Each drum is provided with a circular graduated flange 67, the numbers or indicia thereon serving as a guide to its proper adjustment with reference to the graduations of the dial.

Attention is called to the fact that the lower extremity of the worm spindle 18 is journaled in the part 35 to permit rotation on its longitudinal axis for the purpose of adjusting the dial 17 on the spindle 16. For this purpose the part 35 is bored to receive the lower extremity of the spindle proper, the latter being provided with a circumferential groove which is engaged by the inner extremity of a screw 70 which is threaded into the part 35. By virtue of this construction it will be understood that the worm spindle is mounted to swing or oscillate on the shaft pin 19 whereby it may be drawn into and out of engagement with the worm spindle member 40 of the dial 17, while the spindle member 18 may be rotated on its longitudinal axis in the part 35, in order to adjust the dial 17 rotatably upon its spindle.

Having thus described my invention, what I claim is:

1. An assay balance comprising a base, a post mounted thereon and composed of two telescoping members, the upper and movable member having a nut and being provided with a vertical slot, means applied to the stationary member and entering said slot to prevent rotation of the movable member, a screw journaled to prevent longitudinal travel and threaded in said nut, means for rotating the screw, a frame mounted on the movable member of the post, a spindle journaled in said frame, and a weighing chain having one extremity connected with the beam and its opposite extremity with the said spindle.

2. A balance of the class described comprising a base, a post mounted thereon and composed of two telescoping members, the upper member being movable and provided with a nut, means to prevent the movable member from rotating with respect to the stationary member, but permitting longitudinal travel, a screw journaled to prevent longitudinal travel and threaded in the nut, means for rotating the screw, a frame mounted on the movable member of the post, a spindle journaled in said frame, and a weighing chain having one extremity connected with the beam and its opposite extremity with the spindle.

3. A balance of the class described including a weighing chain, and a beam, a post located adjacent the beam, a drum mounted to rotate on said post and having a spiral groove, the extremities of the weighing chain being respectively connected with the beam and with said drum, and adapted to engage the said groove of the latter, said post being vertically adjustable.

4. A balance of the class described including a weighing chain, an upright support, a drum mounted to rotate on said support and having a spiral groove, the extremities of the weighing chain being respectively connected with the beam and with said drum and adapted to engage the said groove of the latter, and means for automatically adjusting the spindle longitudinally to compensate for the travel of the chain in said groove as the chain is wound upon or unwound from the said drum.

5. A balance of the class described including a frame, a spindle journaled in the frame, a weighing chain having its extremities respectively connected with the beam and the spindle, a registering dial frictionally adjustable on and rotatable with the spindle, the dial having a worm wheel member, and a rotatable worm spindle mounted to swing into and out of engagement with said worm wheel member for adjusting the dial on the first-named spindle.

6. A balance of the class described including a weighing chain, a beam, a frame, a spindle journaled in the frame, the extremities of the chain being respectively connected with the beam and the spindle, a registering dial mounted on the spindle, a star wheel rotatably mounted on the frame and means mounted on the dial and engaging said star wheel to impart a partial rotation to the latter for every complete rotation of the dial.

7. A balance of the class described including a frame, a spindle journaled in the frame, a weighing chain having its extremities respectively connected with the beam and the spindle, a registering dial frictionally adjustable on and rotatable with the spindle, the dial having a worm wheel member and a rotatable worm spindle mounted to swing into and out of engagement with the said worm wheel member for adjusting the dial on the first named spindle, and tension means applied to the worm spindle for maintaining it in the desired position of oscillatory adjustment.

8. A balance of the class described including a frame, a spindle journaled in the frame, a weighing chain having its extremities respectively connected with the beam and the spindle, a registering dial frictionally adjustable on and rotatable with the spindle, the dial having a worm wheel member, and a rotatable worm spindle mounted to swing into and out of engagement with the said worm wheel member for adjusting the dial on the first named spindle, and tension means applied to the worm spindle for maintaining it in the desired position of oscillatory adjustment, said means including a spring actuated piston acting on the extremity of said worm spindle below its axis of oscillation.

9. A balance of the class described including a weighing chain, a beam, a frame, a spindle journaled in said frame, a spirally grooved drum mounted on the spindle, the extremities of the chain being respectively connected with the beam and said drum, the chain being arranged to engage the groove of the drum as the chain is wound upon the spindle, a nut mounted upon the frame and in which the spindle is threaded to adjust the spindle longitudinally to compensate for the travel of the chain upon the drum as it is wound upon or unwound from the latter.

10. A balance of the class described comprising a base, a post mounted on the base, and having a vertically movable upper member carrying a frame, a spindle journaled in the frame, a weighing chain having its extremities respectively connected with the beam and the said spindle, a second spindle, a gearing connection between the two spindles for rotating the first named spindle, a vertically disposed screw stem journaled in the base and threaded in a nut carried by the vertically movable member of the post, a third spindle journaled on the base, and a gearing connection between the same and the screw stem.

In testimony whereof I affix my signature.

JOSEPH H. JACOBS.

Copies of this patent may be obtained for five cents each, by addressing the "Commissioner of Patents, Washington, D. C."